INVENTOR
PAUL S. DICKEY
BY
Raymond W. Jenkins
ATTORNEY

Aug. 22, 1939.　　　　　P. S. DICKEY　　　　　2,170,346
CONTROL SYSTEM
Original Filed Dec. 18, 1935　　8 Sheets-Sheet 3

INVENTOR
PAUL S. DICKEY
BY
Raymond D. Jenkins
ATTORNEY

Aug. 22, 1939.　　　P. S. DICKEY　　　2,170,346
CONTROL SYSTEM
Original Filed Dec. 18, 1935　　8 Sheets-Sheet 8

INVENTOR
PAUL S. DICKEY
BY
Raymond W. Junkins
ATTORNEY

Patented Aug. 22, 1939

2,170,346

UNITED STATES PATENT OFFICE 2,170,346

CONTROL SYSTEM

Paul S. Dickey, Cleveland, Ohio, assignor to Bailey Meter Company, a corporation of Delaware Application December 18, 1935, Serial No. 55,023
Renewed March 25, 1939

21 Claims. (Cl. 122—448)

This invention relates to a method and means for operating and controlling the operation of vapor generators; particularly vapor generators of the drumless, forced flow type, having a fluid flow path including one or more long small-bore tubes, in which the flow in the path is initiated by the entrance of liquid under pressure at one end, and the exit of vapor only at the other end; characterized by an inflow of liquid normally greater than the outflow of vapor, the difference being diverted from the path intermediate the ends thereof.

Such a vapor generator having small liquid storage and operated with wide range combustion devices forms a combination rendering practical extremely high heat release rates with the consequent ability to economically handle practically instantaneous load changes from minimum to maximum, and vice versa, without heavy standby expense, and is particularly suitable for operating conditions such as locomotive service, where load variations are of a wide range and are required to be met substantially instantaneously.

The generator has a minimum liquid storage capacity with a maximum heat absorbing surface so disposed and arranged as to be substantially instantaneously responsive to rapid changes and wide diversities in heat release rate in the furnace. The heat absorbing surface is arranged in relation to the path of the products of combustion and radiant heating so that the entering liquid is received at the cooler end of the path. Further, the vapor generator insofar as the passage of combustion gases is concerned has a continuously increasing resistance to gas flow throughout the length of the passage.

The heat absorbing surface, or flow path for the working medium, is comprised of one or more long small-bore tubes with an enlargement, preferably at the end of the generating section, which acts as a separator to divide liquid and vapor. The vapor is then passed through a superheater, while the excess liquid carried through the tubes for the purpose of wetness and preventing scale deposit, is diverted out of the separator under regulated conditions, as will be hereinafter set forth. From the separator there is a normal continuous and an additional regulated spillover or diversion of a part of the liquid entering the economizer under pressure, so that there is always being fed to and through the economizer and vapor generating sections more liquid than can be converted into vapor in a single passage therethrough, although the proportion of such excess liquid represents but a small part of the total volume of fluid passing through the vapor generator and is at most times only sufficient to insure tube wetness and to carry off scale forming material.

In vapor generators of the character mentioned having small liquid and heat storage with high heat release capabilities, the liquid inflow must of necessity be continuous and at all times proportioned to the vapor outflow, at the same time taking into account the desired diversion of excess liquid from the flow path. Furthermore to accomplish the wide range in heat release with substantially instantaneous response and to perform the combustion process efficiently, a method and means for operating such a vapor generator in accordance with varying conditions must be provided.

A principal object of the invention is to so control the operation of such a vapor generator as to satisfactorily produce wide changes in heat release rate with great speed, through proper regulation of liquid inflow and of the elements of combustion.

A further object is to maintain the efficiency of combustion uniformly high, regardless of sudden and wide variations in rating.

Still another object is to provide a sequence and protective system for maximum safety of operation.

Further objects will become evident from a study of the specification and of the drawings, in which:

Fig. 1 diagrammatically illustrates a drumless forced flow vapor generator to which the present invention is directed.

Fig. 2 diagrammatically illustrates a drumless forced flow vapor generator, combined with the requisite apparatus to control the functioning thereof, and such apparatus shown in partially diagrammatic fashion.

In the various drawings, identical parts bear the same reference numerals.

Figure 1:
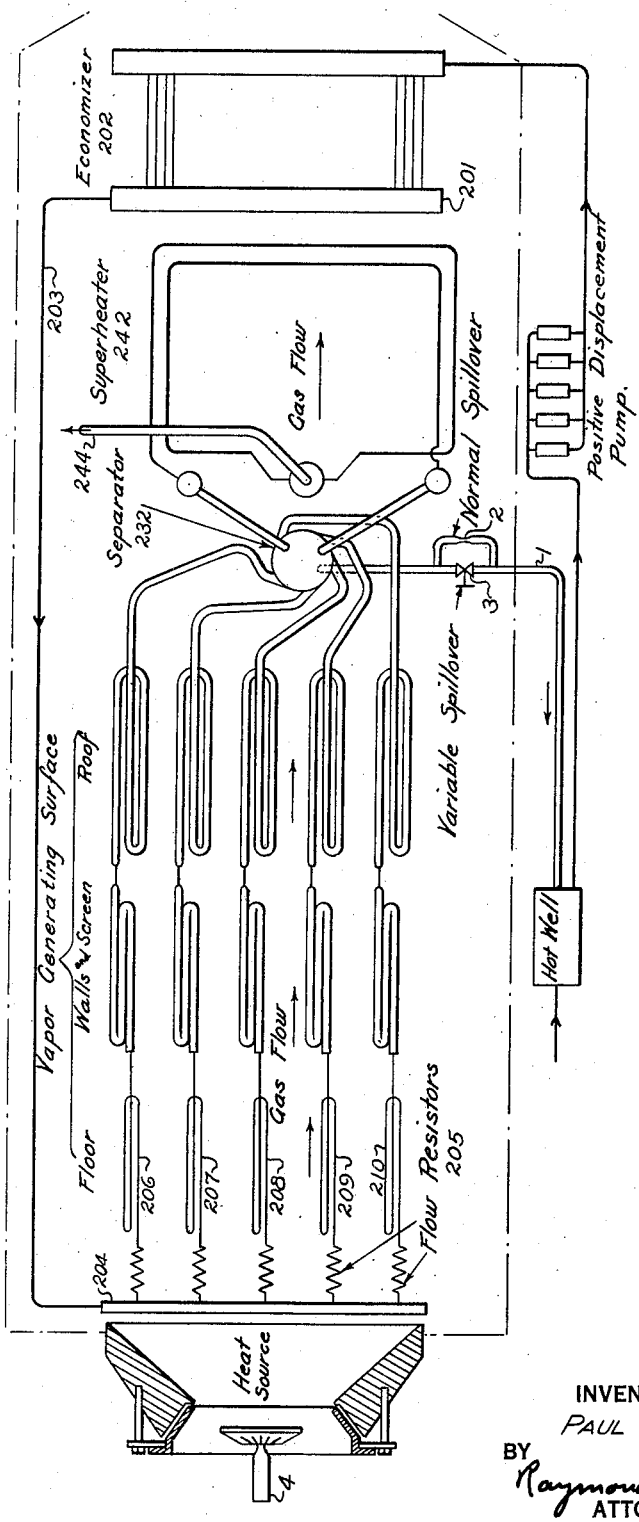

The drumless forced flow vapor generator to which the present invention is directed is diagrammatically illustrated in Fig. 1 to indicate gas flow, working fluid flow, and heat absorbing surface arranged as contained within the enclosure represented by the dot and dash lines.

The flow path for the working medium is comprised of long small-bore tubes brought together at suitable headers. The generator includes an economizer 202 at the cooler end of the gas passage and which receives liquid from a positive displacement pump as shown connected to the hot well.

The liquid from the economizer outlet header 201 is conveyed by a tube 203 to a manifold tube 204 from which the liquid is distributed to the generating section through, in this instance, five fluid flow resistors 205, each of which has a greater resistance drop than the particular fluid flow passage which it serves and whereby the liquid is proportionately distributed to each of the tubular fluid flow passages 206, 207, 208, 209 and 210 constituting the generating section of the assembly, which comprises floor, wall, screen and roof portions as indicated.

These five flow circuits comprising the vapor generating surface tangentially enter a bulge in the fluid flow path which is in the form of a separating chamber 232 for dividing the fluid into liquid and vapor; the vapor passing to a superheater 242, and the excess liquid being diverted from the fluid flow path through a pipe 1 to the hot well or to waste. A normal continuous spillover occurs through the restriction 2 while a variable spillover occurs through the regulating valve 3.

The "heat source" (Fig. 1) includes an oil burner 4 supplied by a pipe 5 (Fig. 2) and an air chamber 6 supplied by a conduit 7. In order to provide for initial ignition of the oil-firing means, a gas-firing device 8 is supplied by a pipe 9 with flow of gas under the control of a solenoid actuated valve 10.

Figure 2:
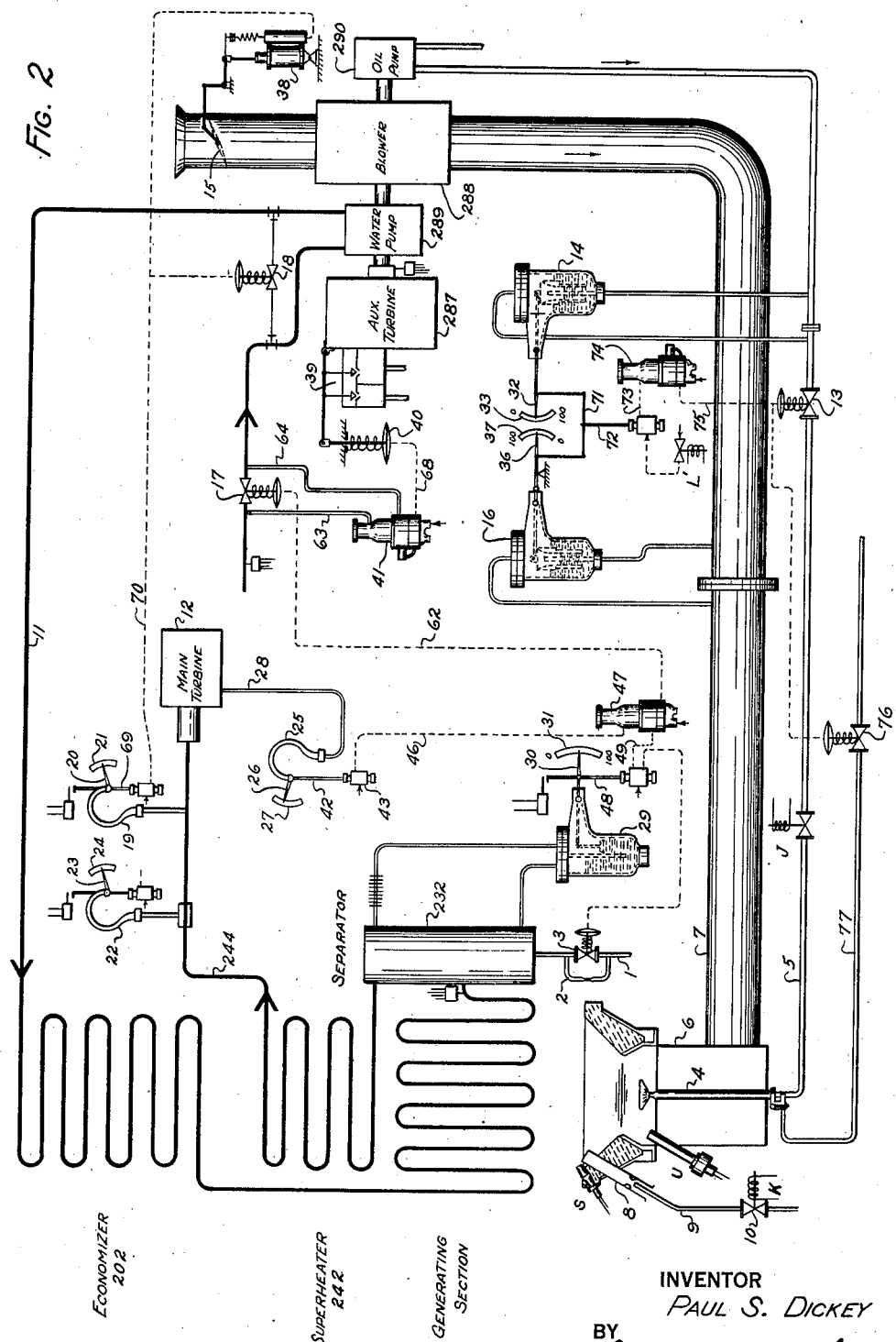

Referring now in particular to Fig. 2, I illustrate the fluid flow path as a single sinuous tube, to the economizer section 202 of which, liquid is supplied under pressure through a pipe 11 from a pump 289, which while it is illustrated in Fig. 1 as a positive displacement pump may be of any suitable type, and which I have therefore illustrated in Fig. 2 merely diagrammatically. From the economizer section the fluid passes to and through the generating section discharging into the separator 232. From the separator, vapor passes to and through the superheater 242, leaving by the conduit 244 to a main turbine 12 illustrative of a vapor consuming device. Products of combustion pass successively through the generating section, superheater, and economizer and may contact a part or all of the separator.

An auxiliary turbine 287 drives the liquid feed pump 289, the air blower 288, and the fuel supply pump 290. While I have illustrated these devices diagrammatically and as though all are located to be driven by the same shaft and at the same speed, it will be understood that the necessary gear reduction, or driving connections between the several devices, are known and would be properly designed as to relative speed, power, etc., and that I merely intend to indicate that the auxiliary turbine 287 drives the devices 289, 288, and 290 simultaneously and in unison.

The rate of supply of fuel oil to the burner 4 is primarily controlled by the speed of the oil pump 290, but the supply of oil is further regulated by the throttling of a regulating valve 13 located in the pipe 5; and the rate of flow is continuously measured by a meter 14.

The rate of supply of air to support combustion is primarily determined by the speed of the blower 288 but is further under the control of a damper 15 positioned in the conduit 7 at the inlet to the blower. The rate of supply of air is continually measured by a flow meter 16.

The rate of supply of liquid under pressure through the conduit 11 is primarily controlled through the speed of the pump 289, but is further influenced through the positioning of the regulating valve 17 at the suction side of the pump and by a regulating valve 18 in a by-pass around the pump.

In the operation of such a vapor generator certain variables are measured, indicated, and utilized as the basis for automatically controlling the supply of liquid thereto and the supply of the elements of combustion to the heating furnace.

I indicate at 19 a pressure responsive device such as a Bourdon tube connected to the conduit 244 and having an indicator pointer 20 adapted to cooperate with an index 21 for advising the instantaneous value of the vapor outflow pressure. At 22 is indicated a temperature responsive device such as a Bourdon tube, forming part of a temperature sensitive system adjacent the conduit 244 and having an indicator pointer 23 adapted to cooperate with an index 24 for advising the instantaneous value of the vapor outflow temperature.

As an indicator of generator output, or load upon the vapor generator, I provide a Bourdon tube 25 adapted to position an indicator pointer 26 relative to an index 27. The Bourdon tube 25 is connected by means of a capillary 28 with the turbine 12 at a location such that the Bourdon tube will be sensitive to first stage shell pressure of the turbine, which pressure bears a substantially straight line relation to rate of steam flow. Thus the pointer 26 will indicate, relative to the scale 27, a reading representative of rate of flow of steam from the vapor generator and thereby an indication of output or load upon the generator.

29 represents means responsive to liquid level within the separator 232 and constitutes a pressure casing enclosing a mercury U-tube connected across the vertical elevation of the separator. A float is adapted to rise and fall with the surface of the mercury in one leg and to thus cause a positioning of a pointer 30 relative to an index 31 to advise the instantaneous value of liquid level within the separator.

The flow meter indicated in general at 14 for providing a measure of the rate of supply of fuel to the furnace is of a known type such as is disclosed in the patent to Ledoux No. 1,064,748. Such a meter is a differential pressure responsive device adapted to correct for non-linear relation between differential pressure and rate of flow, to the end that angular positioning of a pointer 32 relative to the index 33 is by increments directly proportional to increments of rate of flow. I illustrate by dotted lines within the flow meter 14 the outline of the internal construction wherein is a liquid sealed bell having walls of material thickness and shaped as described and claimed in the above mentioned Ledoux patent.

The flow meter 16 for measuring the rate of supply of air for combustion is similar to the meter 14 and positions a pointer 36 relative to an index 37 to provide a continuous indication of the instantaneous rate of flow of air to the furnace.

I preferably primarily control the supply of liquid to the fluid flow path and the elements of combustion to the furnace, through variation in speed of the auxiliary turbine, utilizing the liquid inflow as the basis for such control. Realizing, however, the possible difference in characteristics of the pumps and blower, as well as variations in conditions of operation, I provide readjusting means to supplement the primary control of the elements of combustion. For the air, such readjusting means comprises the damper 15 positioned at the inlet to the blower 288 by a pneumatic actuator 38. For the fuel, the readjusting means comprises the regulating valve 13 positioned in the pipe 5 responsive to departure from desired relation of the measure of fuel flow and the measure of air flow.

The speed of the auxiliary turbine is regulated through varying the opening of governor valves 39 adapted to admit relatively low pressure steam to the turbine, and at certain rates of operation to supplement this by additionally supplying relatively high pressure steam. For example, the low pressure steam may be the exhaust from the main turbine 12 or extraction steam therefrom, while the high pressure steam may be direct from the vapor generator. A pneumatic actuator 40 positions the valves 39 under the influence of an air loading pressure established by a standardizing relay 41 illustrated in detail in Fig. 8.

In order to regulate the liquid inflow (through variation in speed of the water pump) I preferably accomplish the regulation responsive to liquid inflow, vapor outflow, and level of liquid in the separator.

Figure 6:
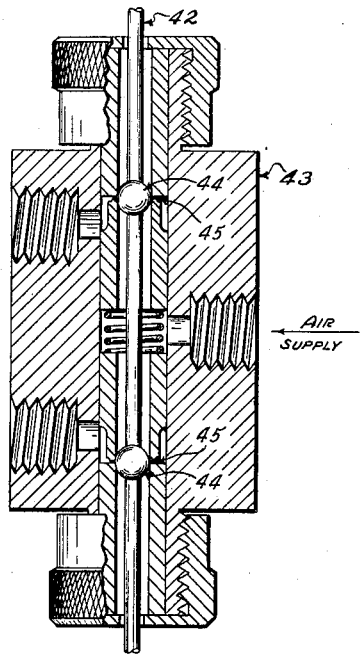
Fig. 6 is a sectional elevation of a pilot valve.

As previously mentioned, the Bourdon tube 25 is positioned responsive to turbine shell pressure representative of vapor outflow from the vapor generator and is adapted to vertically position a pilot stem 42 relative to a pilot casing 43, to which a supply of compressed air may be available as indicated by the small arrow. Such a pilot valve is shown in detail at Fig. 6 and forms the subject matter of the patent to Clarence Johnson No. 2,054,464.

Air under pressure is supplied to the interior of the casing 43 intermediate the pilot lands 44, which lands are so spaced along the stem 42 in definite relation to narrow annular ports 45. When the pilot stem is axially moved in the casing so that the lands 44 are moved relative to the ports 45, then a definite loading pressure is available in the annular ports bearing a known relation to the amount of such movement. For example, if the stem 42 is moved upwardly there is available at the upper left-hand exit of the casing 43 a loading pressure increasing in definite relation to such movement, while if the stem 42 is moved downwardly there is available at the lower left-hand exit a pressure increasing definitely with such movement. When both upper and lower exits (Fig. 2) are in use, the lands are so spaced that an upward movement of the pilot stem 48 will result in an increasing pressure at the upper exit and a decreasing pressure at the lower exit, and vice versa.

I indicate pipes or capillaries for transmitting such air loading pressures, throughout the drawings, by dotted lines to distinguish from electrical connections, or other pipes or conduits. In Fig. 2 then, such a connection is illustrated at 46 for transmitting an air loading pressure bearing a known relation to rate of vapor outflow to a differential relay device 47. Such a differential relay is illustrated in detail at Fig. 7.

In similar manner the liquid level indicator 29 vertically positions a pilot stem 48 to establish at the relay 47, through the connection 49, an air loading pressure representative of liquid level.

Figure 7:
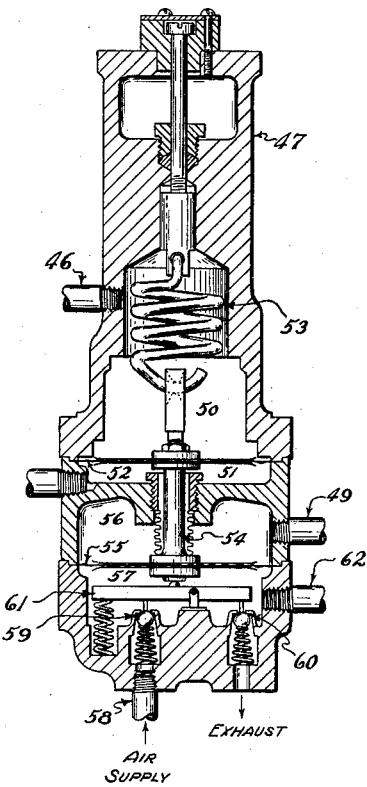
Fig. 7 is a sectional elevation of a pneumatic relay.

Referring to Fig. 7, the connection 46 leads to a chamber 50, separated by a diaphragm or movable partition 52 from a chamber 51 open to the atmosphere. The diaphragm 52 and loading spring 53 are both connected to a stem 54 to which is also attached a diaphragm 55, separating the chambers 56, 57. Connection 49 leads to chamber 56. A supply of air under pressure is available through the connection 58 to the chamber 57 under the control of a valve 59. Exhaust from the chamber 57 to the atmosphere is under the control of a valve 60. The stem 54 is adapted to position a valve actuator 61 to either admit air under pressure through the valve 59, thus increasing the pressure within the chamber 57, or to bleed air to the atmosphere through the valve 60 and thus decrease the pressure within the chamber 57. Pressure within the chamber 57 is transmitted through a connection 62 to a spring loaded diaphragm actuator for positioning the valve 17 in the suction line to the water pump.

Certain features of the differential relay 47 are disclosed and claimed in my Patent No. 2,098,913.

It will be observed that variations in the loading pressure effective through the connection 46, or that effective through the connection 49, will be effective to vary the air pressure within the chamber 57 and correspondingly effective upon the positioning of the valve 17.

The valve 17 acts as a variable orifice across which there will exist a pressure differential bearing a known relation to the rate of flow of liquid through the valve 17. Pressures on opposite sides of the valve are effective through the pipes 63, 64 respectively in chambers 65, 66 of the standardizing relay 41.

Figure 8:
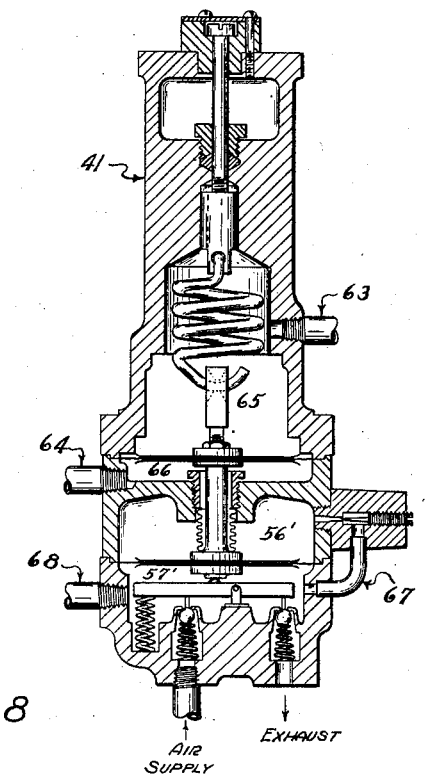
Fig. 8 is similar to Fig. 7 but embodies certain additional features of construction.

Referring now to Fig. 8 it will be observed that the standardizing relay 41 is to a certain extent similar to the relay 47, with the addition of a controllable bleed connection 67 between the chambers 56' and 57', certain features of which construction are disclosed and claimed in the patent to Harvard H. Gorrie, No. 2,098,914. A loading pressure established within chamber 57' is effective through a connection 68 upon the pneumatic actuator 40 for positioning the turbine valves 39. In this instance the function of the controllable bleed connection 67 is to supplement the primary control of the pressure effective upon the actuator 40 with a secondary control, of the same or different magnitude, as a follow up or supplemental action to prevent overtravel and hunting, and wherein the positioning of the actuator 40 will not necessarily be directly with the positioning of the valve 17.

In general the valve 17 is positioned responsive to vapor outflow and to liquid level within the separator and forms a variable orifice in the suction line to the water pump. The device 41 receiving the differential pressure across the valve 17 positions the actuator 40 and the turbine valves 39 to control the speed of the water pump in such manner that the differential pressure across the valve 17 will be held constant regardless of the opening of valve 17 and thus the liquid flow to the water pump is controlled proportional both to vapor outflow and to liquid level within the separator.

If vapor outflow increases, then the pilot stem 42 is raised proportionally, thus proportionally increasing the loading pressure effective through the connection 46, causing a downward movement of the relay stem 54 and a corresponding opening of the valve 59 to additionally admit air under pressure within the chamber 57, thus increasing the air loading pressure through the connection 62. The resulting change in opening of the valve 17 varies the pressure differential effective upon the relay 41, changing the loading pressure effective through the actuator 40 to position the turbine throttle valves 39, and results in an increased flow of water through the conduit 11 commensurate with the increase in vapor outflow from the vapor generator.

Should the liquid level within the separator 232 tend to fall, the pilot stem 48 will be raised, thus increasing the loading pressure in the relay chamber 56, and in like manner further opening the valve 17 to result in an increase in the supply of liquid to the vapor generator.

It will then be observed that the valve 17 is positioned responsive to vapor outflow from the generator and liquid level in the separator, while the speed of the water pump is not only responsive to these two variables but additionally to the rate of flow of water to and through the pump.

The liquid level responsive device 29 further controls, through the pilot stem 48, the positioning of the variable spillover valve 3 in such manner that upon a rise in liquid level within the separator 232 above a predetermined elevation there will be a regulated opening of the valve 3 to supplement the normal spillover 2 to the pipe 1.

Certain features of the control through the utilization of turbine shell pressure are disclosed and claimed in the copending application of Ralph M. Hardgrove, Serial No. 55,027, filed of even date herewith. Certain features directed to the control of the auxiliary turbine are disclosed and claimed in my copending application, Serial No. 55,026, filed of even date herewith. Certain features relating to multiple and sequential control from liquid level within the separator are disclosed and claimed in the copending joint application of Ervin G. Bailey and Paul S. Dickey, Serial No. 55,025, filed of even date herewith.

Under the control of vapor outflow pressure acting upon the Bourdon tube 19, I provide a pilot valve 69 for establishing an air loading pressure through the connection 70 to position the by-pass valve 18 and the damper 15. Upon a fall in vapor pressure from predetermined value the valve 18 and the damper 15 both tend to open, each from a predetermined position. This action is particularly desirable upon sudden material increases in load upon the unit as a whole, thus causing a marked decrease in vapor pressure. When such sudden and material increases in vapor outflow occur, thereby lowering the vapor pressure, the auxiliary turbine speed is increased and the damper 15 is opened. At such time it is desired to increase the supply of fuel and air without immediate increase in supply of liquid. Bypassing the pump by means of the valve 18 reduces liquid flow through conduit 11 and valve 17 and causes the auxiliary turbine to speed up to restore the original liquid flow and in so speeding up increases the air flow and fuel flow. Without the bypass, not only would this advantage be lost, but the momentary increase in liquid inflow when the auxiliary turbine speed is increased, would be more than would be desired to utilize the available heat storage of the unit. The adjustment of the actuator 38 and of the actuator of the valve 18 is preferably such that they will be responsive only to predetermined variations in vapor pressure and corresponding air loading pressure in the connection 70. For example, the damper 15 may be regulated as to position upon any departure of vapor pressure from predetermined value in either direction, while the valve 18 may be completely closed until vapor pressure has fallen a predetermined amount below the desired standard. Beyond that point the valve 18 would begin to open and the damper 15 may, or may not, be completely open while the opening of the valve 18 is being regulated.

I preferably primarily control the supply of the elements of combustion through varying the speed of the auxiliary turbine and thereby the speed of the blower and the oil pump in unison with the liquid inflow. Having readjusted the air supply through a positioning of the damper 15, and provided a measure of air flow by the meter 16, I then utilize the regulating valve 13 in the oil supply line to properly proportion fuel to air. To this end the meters 14, 16 are inter-connected with linkage 71 for positioning a pilot stem 72 to establish an air loading pressure through the connection 73 to the chamber 65 of a standardizing relay 74 in general construction similar to that illustrated at 41. The air loading pressure resultant from operation of the relay 74 is effective through a connection 75 for positioning the regulating valve 13 upon departure of air flow-fuel flow relation from predetermined value, and simultaneously is effective for positioning a regulating valve 76 for control of atomizing steam supplied to the oil burner 4 through a pipe 77.

Figure 3:
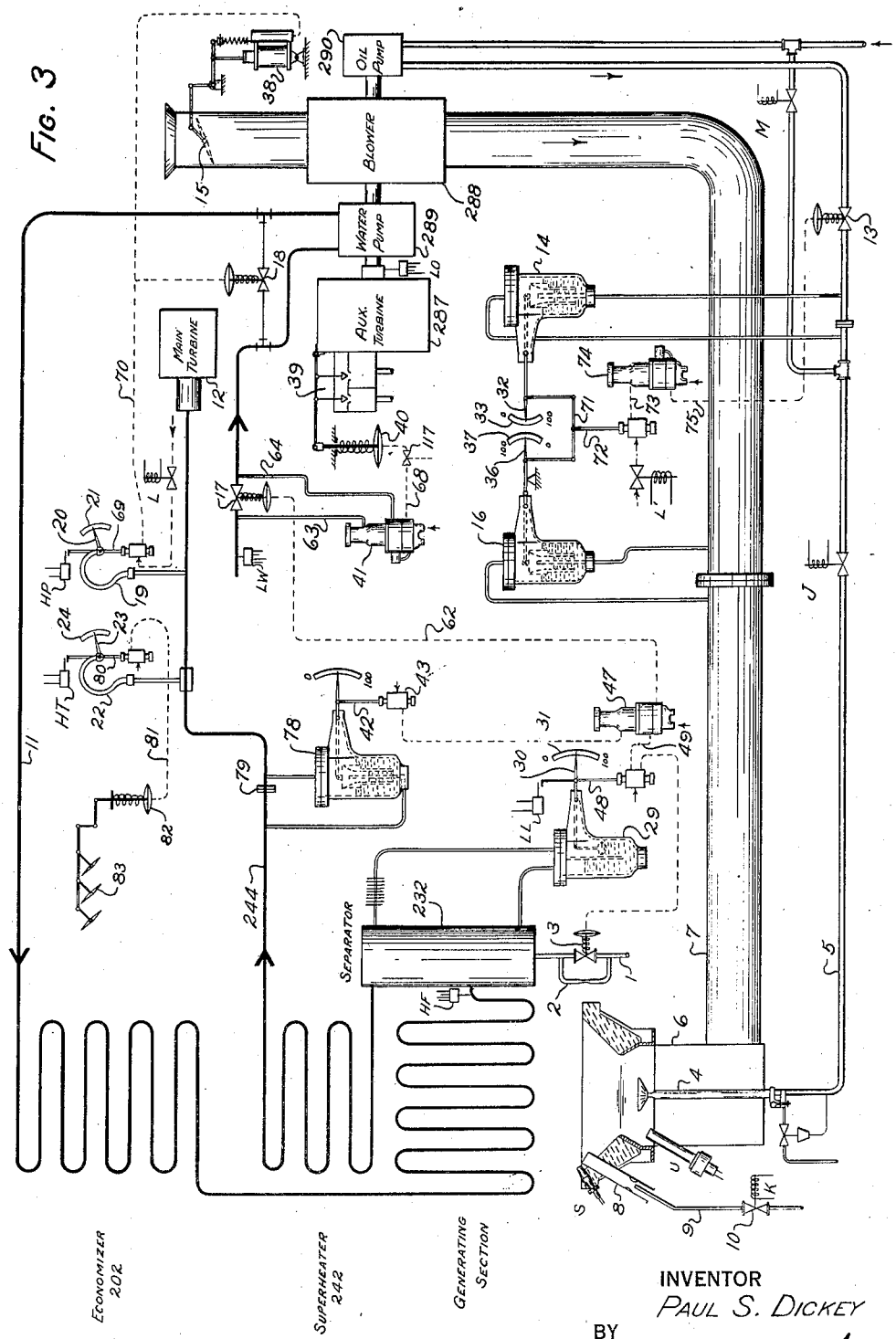
Fig. 3 is similar to Fig. 2 except as to certain details.

Referring now to Fig. 3, I show therein an arrangement similar to that of Fig. 2, but herein I actually measure the vapor outflow through the pipe 244 to a turbine or other utilizer, rather than utilizing shell pressure as in Fig. 2. To this end, I provide a flow meter 78, similar to the flow meter 14, and connected to the pipe 244 across an orifice or other restriction 79. The flow meter is adapted to vertically position a pilot stem 42 relative to a pilot casing 43 to vary an air loading pressure effective upon the relay 47 proportional to the rate of vapor outflow.

The Bourdon tube 22 positioned responsive to variations in vapor outflow temperature, is adapted to vertically position a pilot stem 80 for varying an air loading pressure through the connection 81 upon a pneumatic actuator 82 for positioning a set of dampers 83. The dampers 83 are preferably so located relative to the fluid path through the vapor generator as to control the relative heating of different portions of the fluid path, and thus control the vapor outflow temperature.

Figure 4:
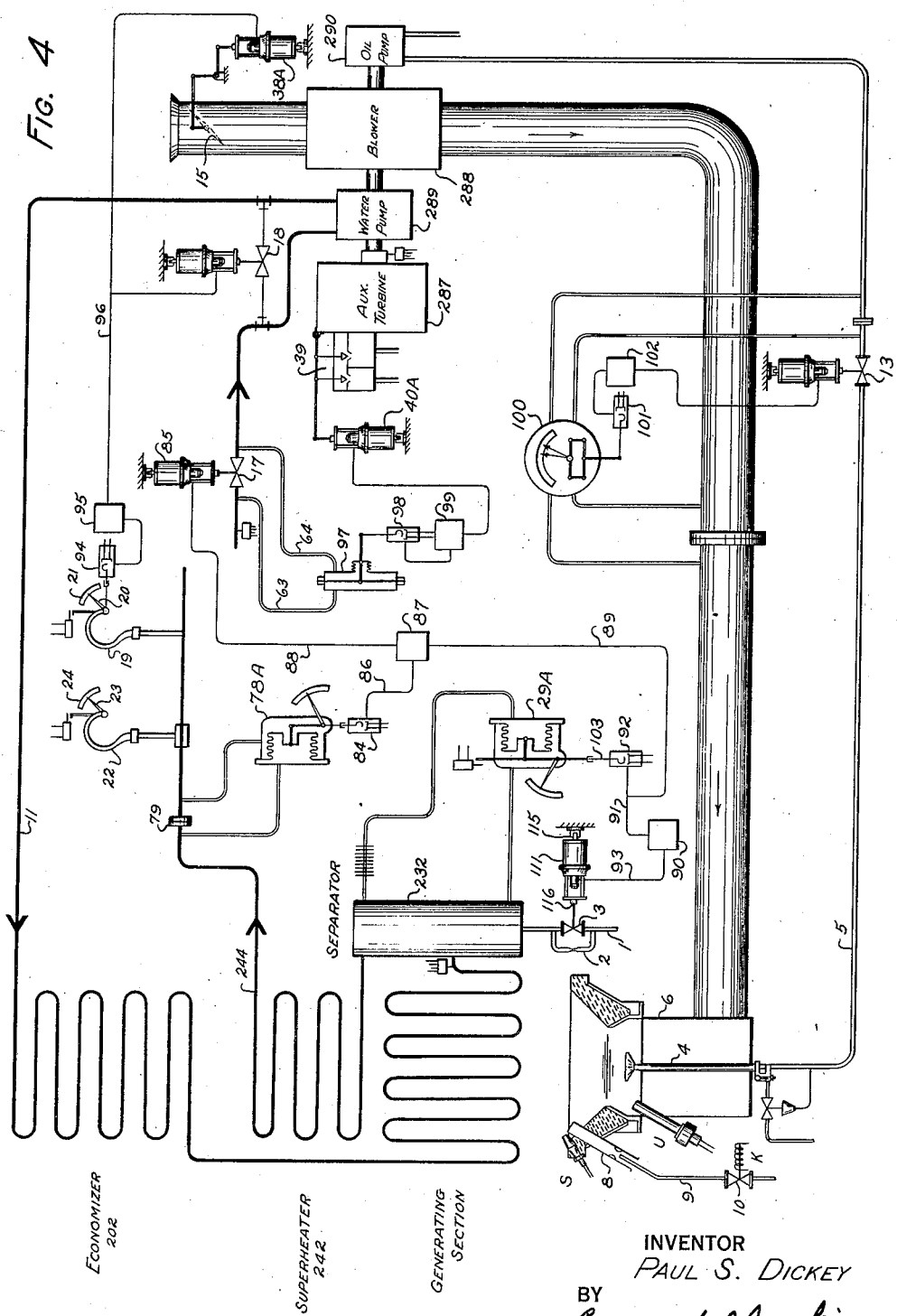
Fig. 4 is in general similar to Fig. 3, but comprising different apparatus for performing the method.

In Fig. 4 I illustrate an embodiment of my invention wherein I utilize electric means for carrying out the method, rather than the air actuated apparatus which I have described in connection with Figs. 2 and 3.

A differential pressure responsive device 78A is used to measure vapor outflow from the vapor generator. The arm, external of the pressure casing, which moves representative of rate of vapor outflow is adapted to position a variable area electrode of an electron discharge device 84 for controlling the positioning of an actuator 85 at the valve 17. In the drawings a single line 86 connects the device 84 with a relay panel 87, which is in turn connected by the conductor 88 with the actuator 85, and by the conductor 89 with the device 92. The latter is connected by the conductor 91 with a relay panel 90. The device 92 is similar to the device 84 and is controlled by the water level responsive device 29A. From the relay panel 90 a conductor 93 joins the actuator of the valve 3.

The Bourdon tube 19 positions the movable electrode of an electron discharge device 94 connected with the relay panel 95 and from there a conductor 96 joints the actuator 38A and the actuator of the valve 18.

A pressure differential responsive device 97 is effective in positioning the movable element of an electron discharge device 98 connected to a relay panel 99 and from there connected with the actuator 40A. The ratio meter 100 combines the functions of the meters 14, 16 of Figs. 2 and 3 to compare the rate of fuel flow and the rate of air flow and, upon departure from predetermined relation between the two, is adapted to move the movable electrode of an electron discharge device 101 connected to a relay panel 102 and to the actuator of the fuel control valve 13.

The conductors indicated at 86, 88, 89, 91, 93, 96, etc. are meant to be cables which may have one or more wires, but the cables are shown as a single line to simplify the drawings.

Figure 9:
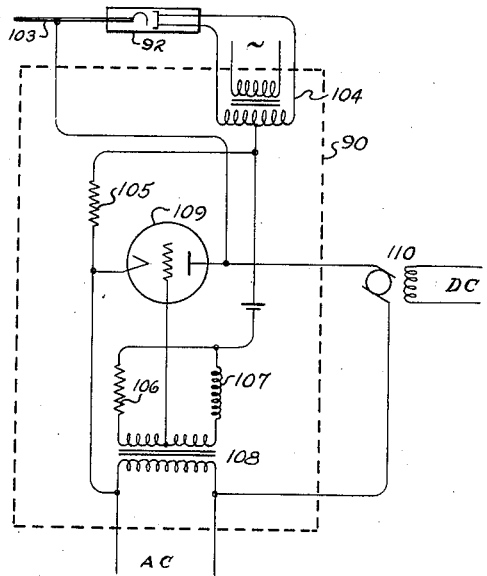
Figs. 9 and 10 are wiring details relating to Fig. 4.

Referring now to Fig. 9 I show the detailed wiring of a relay panel such as 90, 95, 99, and 102. Taking the panel 90 as representative, and referring to Fig. 9, it will be observed that the arm 103, positioned by the water level device, is adapted to move the anode of the electron discharge device 92 relative to the cathode. In connection with the construction of such an electron discharge device, reference is made to the copending application of Elmer D. McArthur, Serial No. 23,194, filed May 24, 1935, and in connection with certain circuits including such a device, reference is made to the patent to John D. Ryder No. 2,112,682.

The cathode of the device 92 is connected to the secondary of a heating transformer 104. 105 and 106 are resistances, 107 is an inductance, 108 a transformer, 109 an electron discharge device, and 110 a motor. The general purpose of the electron discharge device 109 is to control a flow of pulsating direct-current for speed control of motor 110, which rotates in a single direction from zero to maximum speed dependent upon the current passage of the device 109.

The control of such current passage is through controlling the percentage of time of which the device 109 is allowed to conduct, and this by impressing upon the grid of the device 109 the sum of an AC and DC voltage. The AC voltage lagging in phase with respect to the plate voltage through the action of a phase shifting bridge 106, 107, 108 and therefore the point in the cycle at which the grid voltage reaches the threshold value, and allows the device 109 to conduct, may be varied by varying the magnitude of the DC voltage which is in series with the AC voltage. Such variation in magnitude of the DC voltage is accomplished through varying the effective area of the anode of the device 92 by mechanically moving the arm 103. Thus the speed of rotation of the motor 110, forming a part of the actuator 111, is varied through the positioning of the arm 103 by the level responsive device 29A.

Figure 10:
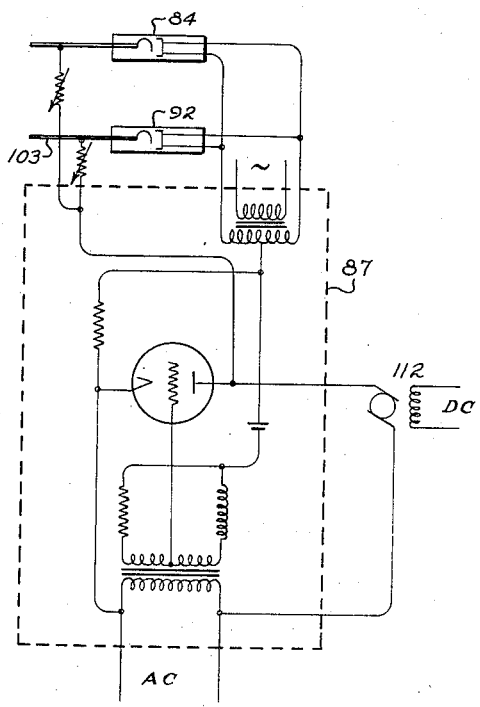

Fig. 10 illustrates the arrangement of relay panel 87 in connection with the electron discharge devices 84 and 92 which are connected in parallel to control the motor 112 of the actuator 85 jointly in response to vapor outflow and liquid level.

Figure 11:
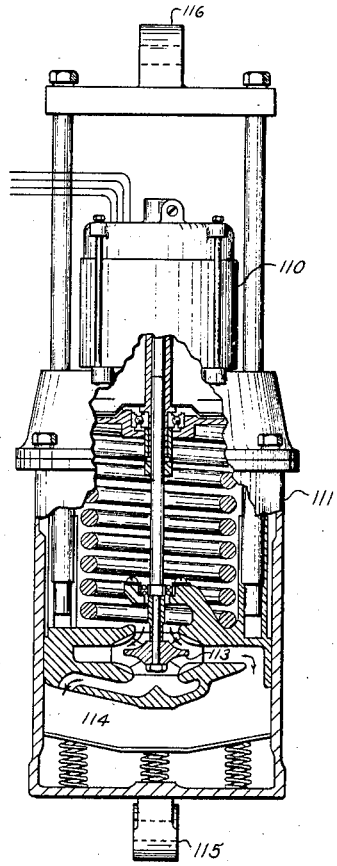
Fig. 11 is a sectional elevation of an operating mechanism of Fig. 4.

At Fig. 11 I illustrate a vertical elevation partially sectioned of the actuator 111, which is typical of the actuators 38A, 85, etc. of Fig. 4. The motor 110 is the motor of the same number of Fig. 9 and is adapted to rotate in a single direction from zero to a maximum speed and at a speed varying with the current impressed across its armature, as clearly indicated in Figs. 9 and 10.

Rotation of the armature drives a fluid pump 113 for forcing a fluid such as oil from the chamber above the piston including the pump 113, to the chamber 114 below the piston. Such a transfer of fluid from one side of the piston to the other tends to move the piston upwardly and such motion is opposed by a compression spring in a manner clearly indicated. The pressure which is opposed by the spring varies with the speed of the motor 110 and if one end of the device, for example, as at 115, is pivotally supported in a relatively fixed manner, then a change in the speed of the motor 110 results in a movement of the end 116 relatively toward or away from the end 115 and such movement, if applied to a valve or other device to be positioned, results in a positioning of said device.

It will, of course, be observed that by changing the direction of rotation of the pump 113 the spring opposing motion may be in tension rather than in compression. Furthermore such spring loading may be external of the device rather than internal.

Figure 5:
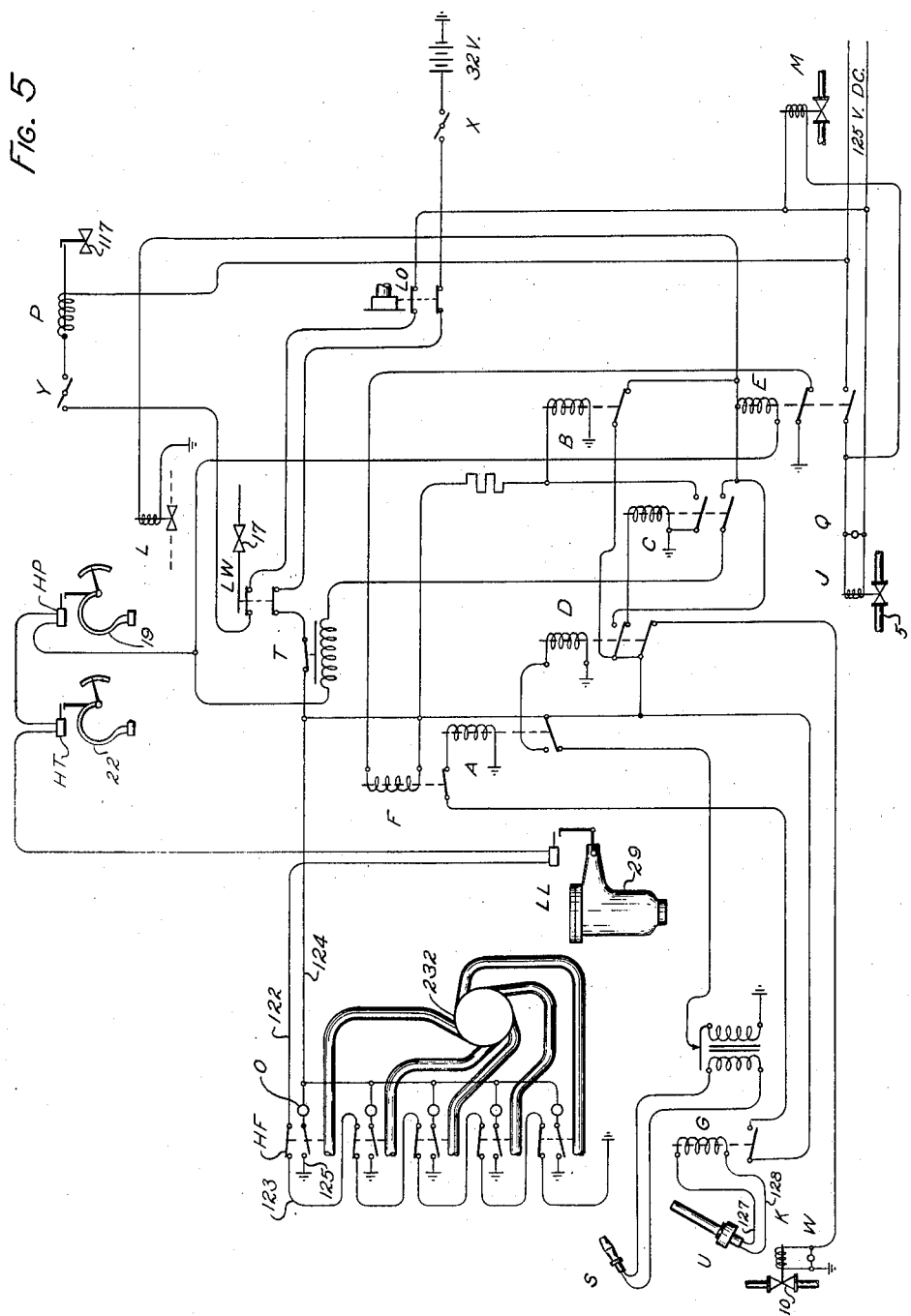
Fig. 5 is a wiring diagram related particularly to the layout of Fig. 3.

In Fig. 5 I illustrate the wiring circuit, particularly in connection with the arrangement of Fig. 3. The relative location and arrangement of the mechanical pieces of apparatus is the same on the two fingures. For example, the Bourdon tubes 19 and 22, as well as the level indicator 29, the valve 10, the valve 17, the pipe 5, and the shaft of the auxiliary turbine are at the same relative locations on Fig. 5 as on Fig. 3. Furthermore, the separator 232 is in the same location except that in Fig. 5 I show what purports to be a plan view with the five tubes 206, 207, 208, 209 and 210 of Fig. 1 leading tangentially into the separator drum 232, and this differing somewhat from Fig. 3.

What may be termed a master switch is shown at X and a second switch at Y. In connection with the pressure responsive Bourdon tube 19 I provide a high pressure trip HP and in connection with the temperature sensitive Bourdon tube 22 I provide a high temperature trip HT. In connection with the level responsive device 29 a low level trip LL is provided and for each of the five tubes leading into the separator drum 232 there is a double contact switch HF actuated upon abnormal temperature within the particular tube with which it is connected. A signal light O is provided with each of the trips HF which lights upon the occurrence of abnormal temperature. At LO is a pressure responsive trip actuated to open two circuits upon abnormal low lubricating oil pressure of the auxiliary turbine shaft. At LW is a switch actuated to open two circuits upon abnormally low water pressure at the inlet to the valve 17.

At S I indicate a spark plug or similar device located adjacent the gas burner 8 Fig. 4 for kindling the fire.

Assuming the unit is not operating and it is desired to start the same, the lighting cycle is as follows: If water pressure is available at LW and lubricating oil available at LO, then closing the switch X starts the ignition spark at S, opens the gas valve 10 through energization of the solenoid K and energizes relays B, C and F. C shorts the coil of B to the ground, causing B to drop out after four seconds and energize E which then opens the fuel-oil valve J in the pipe 5, closes oil by-pass valve M, and opens the coil circuit of F. After four seconds F drops out, energizing A (if the flame is established so that the flame failure device U has energized G). The energizing of A cuts off the ignition and energizes D which shuts off the valve 10, drops out C and closes another circuit to the coil of E. When C drops out, E is energized so that the by-pass of D (to the coil of E) is opened.

A failure of flame at the burner 4 causes G to drop out, deenergizing A which starts the ignition, and D which turns on the valve 10, energizes C, and drops out E. As E drops out, the fuel oil valve J is closed, M is opened, and F energized. The cycle continues as outlined above following the closing of switch X.

If HT, HP, or HF trip out, then E is dropped out closing J, opening M, and energizing F. Then the above mentioned flame failure cycle is followed except that the ignition and gas valve 10 are kept on and E cannot pick up until the particular trip (HF or HP or HT) is closed, due to correcting of the out-of-limit condition.

There is a current flow through the heating element of T whenever C and E are energized, which condition exists when the fuel oil is on and the flame failure detector U has not energized relay G. Thus if the flame is not established at the burner 4 within ten seconds after E is energized, T trips, shutting off S, K, and J. P will also trip after about five consecutive relighting cycles.

In the event of low water pressure to the inlet of the feed pump at LW, or low lubricating oil pressure at LO to the auxiliary set, the ignition S, valve K, and valve J, are shut off by LW or LO.

In addition these trips deenergize the solenoid P, which in turn trips the auxiliary turbine valve operator thus stopping the auxiliary set. The solenoid P normally holds the valve 117 (which is located in the air line 68) in a condition for free passage of air control pressure from 41 to 40. When P is deenergized, the valve 117 closes off connection with the stabilizing relay 41 and opens the diaphragm chamber of the actuator 40 to atmosphere, thus allowing the spring loading of such actuator to position the actuator to its closed position. This trips the auxiliary turbine off.

By the switch X the complete system may be shut down. By the switch Y the auxiliary turbine itself may be tripped out.

A solenoid actuated valve L is located in the air supply line leading to the pilot valve of the pressure sensitive Bourdon tube 19. Referring to the wiring diagram of Fig. 5, it will be observed that L is normally energized holding its valve open. When any of the safety switches trip out and open the electrical circuit to L, the valve closes, thus shutting off the supply of air to the pilot and releasing air pressure from the air pressure pipe 70. The spring loaded valve 18 in the by-pass line around the water pump then closes, as does the damper 15 at the inlet to the air blower.

Such operation is particularly desirable upon excessive temperature actuating any of the switches HF for such trip-out will close the fuel valve J, and it is desirable that the air damper 15 be closed at the same time. The auxiliary set may continue to operate, thus driving the air blower and the only way that air flow to the furnace can be decreased is by shutting off the damper 15. At the same time it is desirable to close the by-pass valve 18 to insure that all of the water being pumped by the water pump goes to the vapor generator to protect against burning out the tubes, and to prevent overspeeding of the pump 289. It is to be understood that by closing the damper 15 I mean that it is to be closed to a predetermined minimum, which may be for example 20% of opening. It is desirable to have the damper go to a minimum opening position when flame fails because the recycling ignition control tends to immediately relight the burner and the blower may still be operating at a high rating.

The solenoid actuated valve L might equally as well be inserted in the air pressure line 70, in which case when deenergized the valve would close off from the pilot 69 and open, to the atmosphere, the diaphragm actuator 18 and the actuator 38.

At L' of Figs. 2 and 3 I indicate a solenoid actuated valve in the air supply line to the pilot 72 of the fuel-air ratio control. This valve is similar in function to the valve L and in the wiring diagram of Fig. 5 may replace, in the electrical circuit, the valve L. It may be connected in parallel with the valve L in the wiring circuit if both valves L and L' are used. It is effective in closing the fuel supply valve 13.

Referring to Fig. 3, the secondary control of fuel supply is by the regulating valve 13 from fuel=air ratio. If air flow varies, the fuel supply varies proportionately. I have provided a solenoid operated valve M in a by-pass around the fuel pump 290, regulating valve 13, and meter 14. This solenoid is electrically in parallel with the solenoid of valve J, so that when J is tripped out and closes the by-pass, valve M automatically opens, thus bypassing oil during that part of the lighting cycle when the main solenoid valve J is closed. If flame fails the valve J closes, which shuts off the supply of fuel to the burner. If I did not provide the by-pass and valve M there would then be a tendency for the meter 14 to decrease to zero and the fuel-air ratio would open the regulating valve 13 wide. If then the recycling opened the valve J there would be a wide open valve 13 which would immediately send a heavy volume of oil through J to the burner far in excess of what was desired. By providing the by-pass and valve M, then when the fire goes out and J is closed, the valve M opens and the flow through the meter 14 is maintained approximately as it was before in ratio with the air but the oil is now bypassing back through the valve M. The valve 13 does not open excessively or materially further than it was before and thus the flow available at J when J next opens is not excessive.

Referring particularly to Fig. 3, it is sometimes desirable to maintain the level within the separator 232 variable (directly or inversely) with rating. This may be accomplished through relative adjustment of the range and sensitivity of the control from the steam outflow meter 78 (representative of rating) and of the level recorder 29. Such adjustment will allow of control tending to maintain the level within the separator at a predetermined value, or at a level increasing with rating or at a level decreasing with rating in desired manner.

Figures 12, 13:
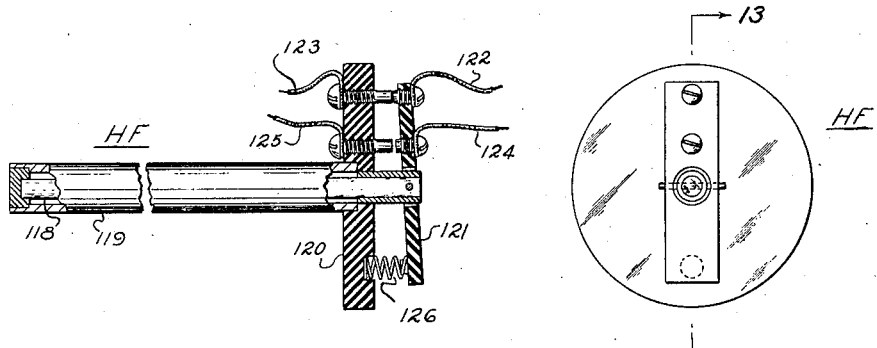
Fig. 12 illustrates a thermostatic relay.
Fig. 13 is partial-section, in the direction of the arrows, along the line 13—13 of Fig. 12.

At Figs. 12 and 13 I show an assembly of a temperature switch HF. In preferred construction a quartz rod 118 and its encasing metal tube 119 are located in or adjacent to one of the tubes as, for example, 206 just before it enters the separator 232. The encasing tube 119 is fastened in an insulating member 120, while the quartz rod 118 is slidable therethrough. A second insulating member 121 is pivotally fastened to the quartz rod and is spring urged away from the member 120.

When subjected to a temperature below a predetermined high value, the relative location of parts is as shown in Fig. 13 wherein contact is closed between wires 122 and 123 and opened between wires 124 and 125. As temperature increases the metallic tube 119 elongates to the left from the member 120, carrying with it the quartz rod 118 which has relatively no variation in length with temperature. Such motion of the quartz rod to the left moves the member 121 around the contact 122, 123 as a pivot and against the compression of the spring 126 until at a certain degree of motion the contacts 124, 125 are closed, thus lighting the signal light O. If further increase in temperature occurs, then at a predetermined temperature further expansion of the tube 119 causes the member 121 to pivot around the contact 124, 125 open-circuiting the contacts 122, 123 and tripping off the unit.

Figures 14, 15:
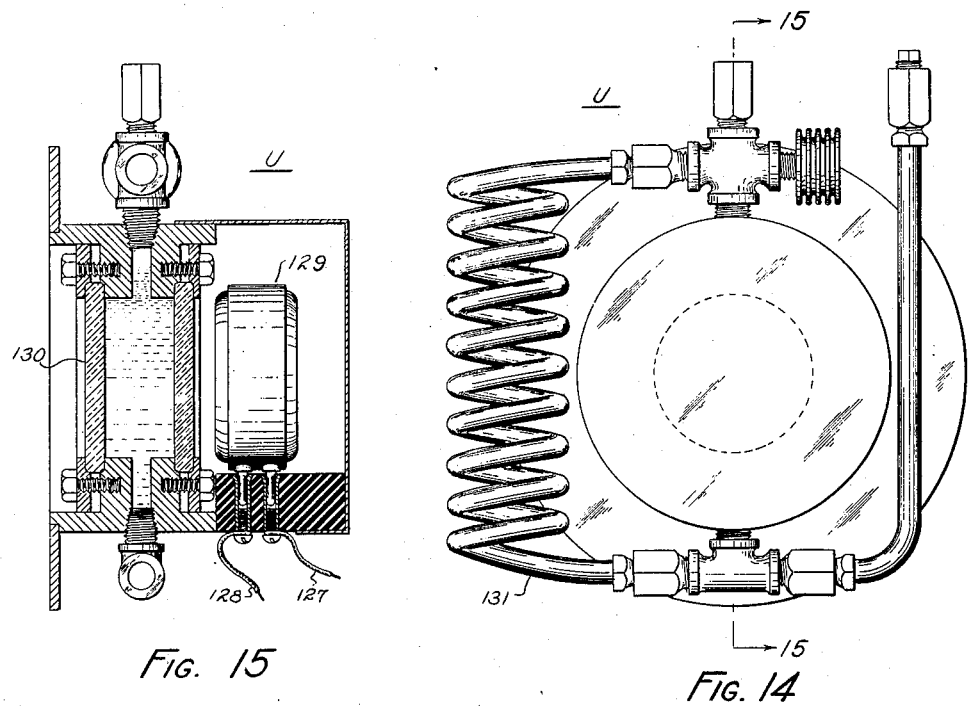
Fig. 14 is an elevation of a flame responsive device.
Fig. 15 is a sectional elevation of Fig. 14 along the line 15—15 in the direction of the arrows.

At Figs. 14 and 15 I illustrate a preferred construction of the device U, which I term a flame failure detector. A photronic cell 129 is located to look at the flame from the burner 4 and generates a current in the wires 127, 128 effective to energize the relay G when flame is present in the furnace. Between the photronic cell 129 and the flame is located a water cell or screen 130 provided with a thermal circulation system 131.

Certain features of the wiring diagram, ignition and flame failure circuits, temperature switch HF, and flame failure detector U, are disclosed and claimed in the co-pending application of Jack F. Shannon, Serial No. 55,028, filed of even date herewith. Certain features of my invention disclosed but not claimed herein are disclosed and claimed in my co-pending divisional applications entitled Control systems, S. N. 202,381, filed April 16, 1938; 206,304 filed May 5, 1938, and 206,305 filed May 5, 1938.

While I have chosen to illustrate and describe certain preferred embodiments of my invention, it is to be understood that this is by way of illustration only and that I am not to be limited thereby except as to the claims in view of prior art.

What I claim as new, and desire to secure by Letters Patent of the United States, is:

1. The method of operating a vapor generator of the drumless forced flow type which includes measuring vapor outflow, and utilizing such measured vapor outflow in supplying liquid under pressure at one end of the fluid flow path continuously in predetermined excess over measured vapor outflow from the other.

2. The method of operating a vapor generator of the drumless forced flow type, which includes measuring vapor outflow, utilizing such measured vapor outflow in normally supplying liquid under pressure at one end continuously in predetermined excess over measured vapor outflow from the other, and continuously diverting the excess from the fluid flow path intermediate the ends thereof.

3. The method of operating a vapor generator of the drumless forced flow type which includes measuring vapor outflow, utilizing such measured vapor outflow in normally supplying liquid under pressure at one end continuously in predetermined excess over measured vapor outflow from the other, and continuously diverting the excess liquid from the fluid flow path adjacent the division zone between liquid and vapor.

4. The method of operating a vapor generator of the drumless forced flow type which includes measuring vapor outflow, utilizing such measured vapor outflow in normally supplying liquid under pressure at one end continuously in predetermined excess over measured vapor outflow from the other, continuously diverting the excess liquid from the fluid flow path adjacent the division zone between liquid and vapor, and maintaining the division zone at a predetermined location.

5. The method of operating a vapor generator of the drumless forced flow type which includes the steps of normally supplying liquid under pressure at one end in excess over measured vapor outflow from the other, continuously diverting the excess liquid from the fluid flow path adjacent the division zone between liquid and vapor, and maintaining the division zone at a predetermined location through control of additional diversion.

6. The method of controlling the operation of a vapor generator of the drumless forced flow type receiving liquid under pressure at one end and delivering superheated vapor only at the other, which includes the steps of normally controlling liquid inflow in excess over measured vapor outflow, continuously diverting the excess liquid from the fluid flow path adjacent the division zone between liquid and vapor, modifying liquid inflow in accordance with departure of the division zone from predetermined location, and maintaining the division zone at a predetermined location through control of additional diversion.

7. The method of operating a vapor generator of the drumless forced flow type having a separator between the generating and superheating portions of the fluid flow path, which includes, measuring vapor outflow, normally controlling liquid inflow continuously in predetermined excess to measured vapor outflow, and utilizing liquid level of the excess liquid to modify liquid inflow.

8. The method of operating a vapor generator of the drumless forced flow type having a separator between the generating and superheating portions of the fluid flow path which includes, normally controlling liquid inflow and heating in accordance with an indication of vapor outflow, and utilizing liquid level in the separator to modify such control.

9. The method of operating a vapor generator of the drumless forced flow type having a separator between the generating and superheating portions of the fluid flow path, which includes the steps of, controlling liquid inflow and the supply of fuel and air for combustion jointly responsive to vapor outflow, liquid inflow and liquid level in the separator; readjusting air from vapor outflow pressure; and readjusting fuel by air flow-fuel flow relation.

10. The method of controlling the operation of a vapor generator of the drumless forced flow type having a separator between the generating and superheating portions of the fluid flow path which includes, normally controlling liquid inflow and heating jointly responsive to vapor outflow, liquid inflow and liquid level in the separator.

11. The method of controlling the operation of a vapor generator of the drumless forced flow type having a separator between the generating and superheating portions of the fluid flow path which includes, normally controlling liquid inflow in accordance with an indication of vapor outflow, and utilizing liquid inflow and liquid level in the separator to modify such control.

12. The combination with a vapor generator having small liquid storage and a high rate of evaporation, of a liquid supply pump therefor, means controlling the speed of said pump responsive to liquid inflow and vapor outflow, and means for variably by-passing the pump responsive to vapor outflow pressure.

13. The combination with a vapor generator having small liquid storage and a high rate of evaporation, of a liquid supply pump, and air supply blower. means jointly controlling the speed of said pump and said blower responsive to liquid inflow and vapor outflow, and means responsive to vapor outflow pressure variably by-passing the pump and regulating air admission to the blower.

14. In combination, a vapor generator, power means for driving liquid supply means, air supply means, and fuel supply means in unison; and regulating means for said power means jointly responsive to measured outflow and to measured liquid inflow.

15. In combination, a vapor generator having small liquid storage and a high rate of evaporation, power means for driving liquid supply means, air supply means, and fuel supply means in unison; regulating means for said power means responsive to vapor outflow and liquid inflow, and means responsive to vapor outflow pressure for variably by-passing said liquid supply means and for regulating air admission to the air supply means.

16. The method of operating a vapor generator of the drumless forced flow type having a separator between the generating and superheating portions of the fluid flow path which includes, normally controlling liquid inflow and heating in accordance with an indication of vapor outflow, utilizing liquid level in the separator to modify such control, and utilizing vapor outflow temperature to regulate the degree of superheat.

17. The combination with a vapor generator of the drumless forced flow type receiving liquid under pressure at one end and delivering superheated vapor at the other, a separator between the generating and superheating portions of the fluid flow path, and means responsive to liquid level within the separator for simultaneously controlling liquid inflow, fuel, air, and liquid diversion from the separator.

18. The combination with a vapor generator of the drumless forced flow type receiving liquid under pressure at one end and delivering superheated vapor at the other, a separator between the generating and superheating portions of the fluid flow path, and means including electron discharge devices and responsive to liquid level within the separator for controlling liquid inflow and the elements of combustion to the generator.

19. The combination with a vapor generator of the drumless forced flow type receiving liquid under pressure at one end and delivering superheated vapor at the other, a separator between the generating and superheating portions of the fluid flow path, and means responsive to level of liquid within the separator and adapted to regulate the supply of liquid and the elements of combustion to the vapor generator over a certain range of level and regulate level within the separator over a certain range of level.

20. In combination, a vapor generator of the drumless forced flow type having a separator between the generating and superheating portions of the fluid flow path, a pilot valve, a meter responsive to level within the separator and adapted to position the pilot valve to establish two fluid pressures varying with level and oppositely in direction, means responsive to one of the fluid pressures for controlling liquid inflow to the generator, and means responsive to the other fluid pressure for controlling liquid diversion from the fluid flow path.

21. In combination, a vapor generator of the drumless forced flow type having a separator between the generating and superheating portions of the fluid flow path, means for supplying liquid and the elements of combustion to said generator, and means jointly responsive to vapor outflow and liquid inflow and liquid level in said separator for effecting regulation of said first named means.

PAUL S. DICKEY.